United States Patent
Kizuka et al.

(10) Patent No.: US 10,844,796 B2
(45) Date of Patent: Nov. 24, 2020

(54) GAS ENGINE DRIVE SYSTEM AND METHOD OF CONTROLLING GAS ENGINE

(71) Applicant: KAWASAKI JUKOGYO KABUSHIKI KAISHA, Kobe (JP)

(72) Inventors: Tomoaki Kizuka, Takatsuki (JP); Yosuke Nonaka, Himeji (JP); Hiroyoshi Ishii, Kobe (JP); Satoru Fukao, Kobe (JP); Shigeharu Fujihara, Amagasaki (JP); Towa Hirayama, Kakogawa (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 359 days.

(21) Appl. No.: 16/073,893

(22) PCT Filed: Nov. 1, 2016

(86) PCT No.: PCT/JP2016/082434
§ 371 (c)(1),
(2) Date: Jul. 30, 2018

(87) PCT Pub. No.: WO2017/130502
PCT Pub. Date: Aug. 3, 2017

(65) Prior Publication Data
US 2019/0040807 A1    Feb. 7, 2019

(30) Foreign Application Priority Data
Jan. 29, 2016  (JP) .................................. 2016-016200

(51) Int. Cl.
*F02D 41/00* (2006.01)
*F02D 41/04* (2006.01)
(Continued)

(52) U.S. Cl.
CPC .......... *F02D 41/0007* (2013.01); *F02B 37/12* (2013.01); *F02D 19/02* (2013.01);
(Continued)

(58) Field of Classification Search
CPC ................ F02B 37/12; F02B 2037/122; F02B 2037/125; F02D 23/00; F02D 41/0007; F02D 43/00–04
(Continued)

(56) References Cited

U.S. PATENT DOCUMENTS

| | | | |
|---|---|---|---|
| 6,327,856 B1 * | 12/2001 | Iwabuchi | F02B 1/12 60/603 |
| 2009/0071439 A1 | 3/2009 | Shiraishi et al. | |
| 2011/0259298 A1 | 10/2011 | Imamura et al. | |

FOREIGN PATENT DOCUMENTS

| | | |
|---|---|---|
| JP | 2009-057870 A | 3/2009 |
| JP | 2010-084681 A | 4/2010 |

* cited by examiner

*Primary Examiner* — Mark A Laurenzi
*Assistant Examiner* — Mickey H France
(74) *Attorney, Agent, or Firm* — Oliff PLC (57) ABSTRACT

A gas engine drive system includes: a gas engine including combustion chamber; a turbocharger including a compressor and turbine; a fuel injection system that injects fuel gas into intake air that is supplied from compressor to combustion chamber via an intake passage; a pressure detector detecting a charge air pressure; a temperature detector detecting the intake air's temperature; and controller controlling the fuel injection system. The controller: when required output decreases, determines the charge air pressure's lean limit based on target injection amount corresponding to required output that has decreased; if the charge air pressure is lower than or equal to the lean limit, decreases fuel injection amount to target injection amount; if the charge air pressure is higher than lean limit, brings fuel injection amount to
(Continued)

zero. When the charge air pressure becomes lower than or equal to the lean limit, increases fuel injection amount to target injection amount.

16 Claims, 9 Drawing Sheets

(51) Int. Cl.
*F02D 41/36* (2006.01)
*F02D 41/14* (2006.01)
*F02D 23/00* (2006.01)
*F02D 19/02* (2006.01)
*F02D 41/12* (2006.01)
*F02D 41/34* (2006.01)
*F02B 37/12* (2006.01)

(52) U.S. Cl.
CPC ......... *F02D 23/00* (2013.01); *F02D 41/0005* (2013.01); *F02D 41/0027* (2013.01); *F02D 41/04* (2013.01); *F02D 41/12* (2013.01); *F02D 41/126* (2013.01); *F02D 41/1454* (2013.01); *F02D 41/34* (2013.01); *F02D 41/36* (2013.01); *F02D 2200/0406* (2013.01); *F02D 2200/0414* (2013.01); *Y02T 10/12* (2013.01); *Y02T 10/30* (2013.01)

(58) Field of Classification Search
USPC ............................ 60/601, 611; 123/563, 564
See application file for complete search history.

LEAN LIMIT α MAP

| | | TARGET INJECTION AMOUNT [m³/s] | | |
|---|---|---|---|---|
| | | SMALL | ... | LARGE |
| ROTATIONAL SPEED [rpm] | LOW | $\alpha_{1,1}$ | ... | $\alpha_{n,1}$ |
| | ⋮ | ⋮ | | ⋮ |
| | HIGH | $\alpha_{1,m}$ | ... | $\alpha_{n,m}$ |

GAS ENGINE DRIVE SYSTEM AND METHOD OF CONTROLLING GAS ENGINE

TECHNICAL FIELD

The present invention relates to a gas engine drive system including a turbocharger and a gas engine. The present invention also relates to a method of controlling a gas engine equipped with a turbocharger.

BACKGROUND ART

Conventionally, gas engines that combust a fuel gas, such as natural gas or town gas, have been mainly used in power generating equipment (see Patent Literature 1, for example). In recent years, in view of various issues such as the crude oil resource amount and exhaust gas regulations, it has been proposed to use a gas engine as a main engine of a ship instead of a diesel engine that uses heavy oil as a fuel.

For example, Patent Literature 2 discloses a gas engine drive system in which a 4-stroke gas engine is combined with a turbocharger. One of the applications intended by Patent Literature 2 is the installation of the gas engine drive system in a ship. The gas engine includes a combustion chamber formed by a cylinder and a piston. The turbocharger includes: a compressor connected to the combustion chamber via an intake passage; and a turbine connected to the combustion chamber via an exhaust passage. The intake passage is provided with a throttle valve, and a mixer that mixes air with a fuel gas supplied from a fuel flow control valve is provided upstream of the compressor.

In the system disclosed by Patent Literature 2, in order to improve load responsiveness while keeping highly precise air-fuel ratio (excess air ratio) control, when a change occurs in a speed command value signal that is a target value of the engine rotational speed, the fuel gas flow rate and the degree of opening of the throttle valve are changed. In particular, Patent Literature 2 describes in relation to the fuel gas flow rate that the upper limit value of the fuel gas flow rate may be determined based on the lower limit value of the excess air ratio in order to prevent misfire and abnormal combustion.

CITATION LIST

Patent Literature

PTL 1: Japanese Laid-Open Patent Application Publication No. 2010-84681
PTL 2: Japanese Laid-Open Patent Application Publication No. 2009-57870

SUMMARY OF INVENTION

Technical Problem

Figure 9:
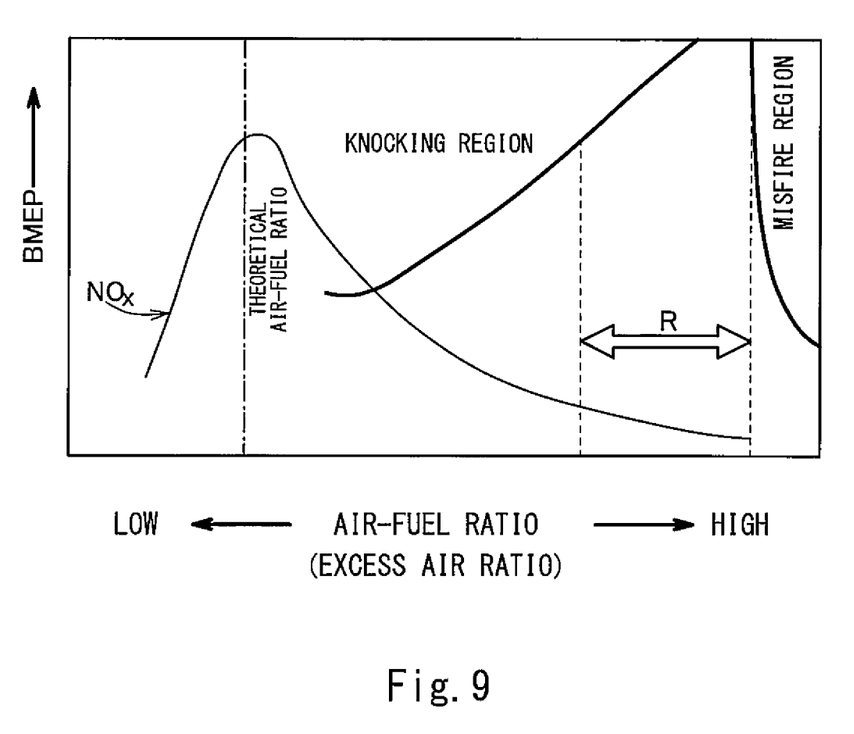
FIG. 9 is a graph showing a knocking region and a misfire region of a gas engine, the graph having a horizontal axis that represents air-fuel ratio and a vertical axis that represents brake mean effective pressure.

It is generally known that, in a gas engine, as shown in FIG. 9, there exist a knocking region and a misfire region based on the relationship between the air-fuel ratio and the brake mean effective pressure (BMEP). Therefore, in order to obtain high power, it is important to control the air-fuel ratio to be between the knocking region and the misfire region as indicated by an arrow R in FIG. 9 (so-called lean burn).

Patent Literature 2 describes that the upper limit value of the fuel gas flow rate may be determined based on the lower limit value of the excess air ratio. This seems to be intended for a time when the required output increases. On the other hand, when the required output decreases, it is necessary to decrease the fuel gas. When the fuel gas is to be decreased, the amount of air introduced into the combustion chamber also needs to be decreased, otherwise the operating point in the range R shown in FIG. 9 may move to the right into the misfire region. When misfire occurs, the fuel gas that is uncombusted is discharged from the gas engine.

However, in a gas engine equipped with a turbocharger, even when the fuel gas is decreased, the amount of air discharged from the compressor does not decrease immediately due to the inertia of the turbocharger. Therefore, in a case where no throttle valve is provided on the intake passage between the compressor and the combustion chamber, how to decrease the fuel gas while preventing misfire is a technical problem.

In view of the above, an object of the present invention is to provide a gas engine drive system and a method of controlling a gas engine, the system and the method making it possible to decrease the fuel gas when the required output decreases while preventing misfire and suppressing the discharge of the uncombusted fuel gas even if no throttle valve is provided on the intake passage.

Solution to Problem

In order to solve the above-described problems, a gas engine drive system according to the present invention includes: a gas engine including a combustion chamber formed by a cylinder and a piston; a turbocharger including a compressor connected to the combustion chamber via an intake passage and a turbine connected to the combustion chamber via an exhaust passage; a fuel injection system that injects a fuel gas into intake air that is supplied from the compressor to the combustion chamber via the intake passage; a pressure detector that detects a charge air pressure that is a pressure of the intake air; a temperature detector that detects a temperature of the intake air, and a controller that controls the fuel injection system, the controller calculating a target injection amount of the fuel gas in accordance with a required output. The controller: when the required output decreases, determines a lean limit of the charge air pressure based on the target injection amount corresponding to the required output that has decreased; if the charge air pressure detected by the pressure detector is lower than or equal to the lean limit, decreases a fuel injection amount to the target injection amount; and if the charge air pressure detected by the pressure detector is higher than the lean limit, brings the fuel injection amount to zero, and then when the charge air pressure detected by the pressure detector becomes lower than or equal to the lean limit, increases the fuel injection amount to the target injection amount.

According to the above configuration, when the required output decreases, the fuel gas is not injected if the charge air pressure is higher than the lean limit. This makes it possible to prevent misfire and suppress the discharge of the uncombusted fuel gas. If the charge air pressure is lower than or equal to the lean limit when the required output decreases, or if the charge air pressure becomes lower than or equal to the lean limit during the time in which the fuel injection amount is kept to zero, then the fuel injection amount is set to the target injection amount. This makes it possible to shift the fuel injection amount to the target injection amount at an optimal timing.

For example, the above gas engine drive system may further include a temperature detector that detects a temperature of the intake air. After determining the lean limit of the charge air pressure, the controller may correct the lean limit of the charge air pressure based on the temperature of the intake air detected by the temperature detector.

The controller may determine the lean limit by using a lean limit map in which lean limit values are defined in association with the target injection amount and a rotational speed of the gas engine.

The above gas engine drive system may further include an open passage for releasing air in the intake passage into an atmosphere, the open passage being provided with an open/close valve. The controller may: when the required output increases during a time in which the fuel injection amount is kept to zero, re-determine the lean limit of the charge air pressure based on the target injection amount corresponding to the required output that has increased; if the charge air pressure detected by the pressure detector is lower than or equal to the re-determined lean limit, increase the fuel injection amount to the target injection amount; and if the charge air pressure detected by the pressure detector is higher than the re-determined lean limit, open the open/close valve. According to this configuration, when the open/close valve is opened, the charge air pressure can be lowered immediately. This consequently makes it possible to improve the responsiveness of the gas engine to the increase in the required output.

After opening the open/close valve, when the charge air pressure detected by the pressure detector becomes lower than or equal to the re-determined lean limit, the controller may close the open/close valve, and increase the fuel injection amount to the target injection amount.

The present invention also provides a method of controlling a gas engine equipped with a turbocharger. The method includes: when a required output decreases, determining a lean limit of a charge air pressure that is a pressure of intake air supplied from the turbocharger to the gas engine; if the charge air pressure is lower than or equal to the lean limit, decreasing a fuel injection amount to a target injection amount corresponding to the required output that has decreased; and if the charge air pressure is higher than the lean limit, bringing the fuel injection amount to zero, and then when the charge air pressure becomes lower than or equal to the lean limit, increasing the fuel injection amount to the target injection amount. This method, similar to the above gas engine drive system, makes it possible to decrease the fuel gas when the required output decreases while preventing misfire and suppressing the discharge of the uncombusted fuel gas.

The above method of controlling the gas engine may include: when the required output increases during a time in which the fuel injection amount is kept to zero, re-determining the lean limit of the charge air pressure; if the charge air pressure is lower than or equal to the re-determined lean limit, increasing the fuel injection amount to a target injection amount corresponding to the required output that has increased; and if the charge air pressure is higher than the re-determined lean limit, releasing air that is to be supplied from the turbocharger to the gas engine into an atmosphere.

For example, the above gas engine may be used as a main engine of a ship.

Advantageous Effects of Invention

The present invention makes it possible to decrease the fuel gas when the required output decreases while preventing misfire and suppressing the discharge of the uncombusted fuel gas.

DESCRIPTION OF EMBODIMENTS

Figure 1A:
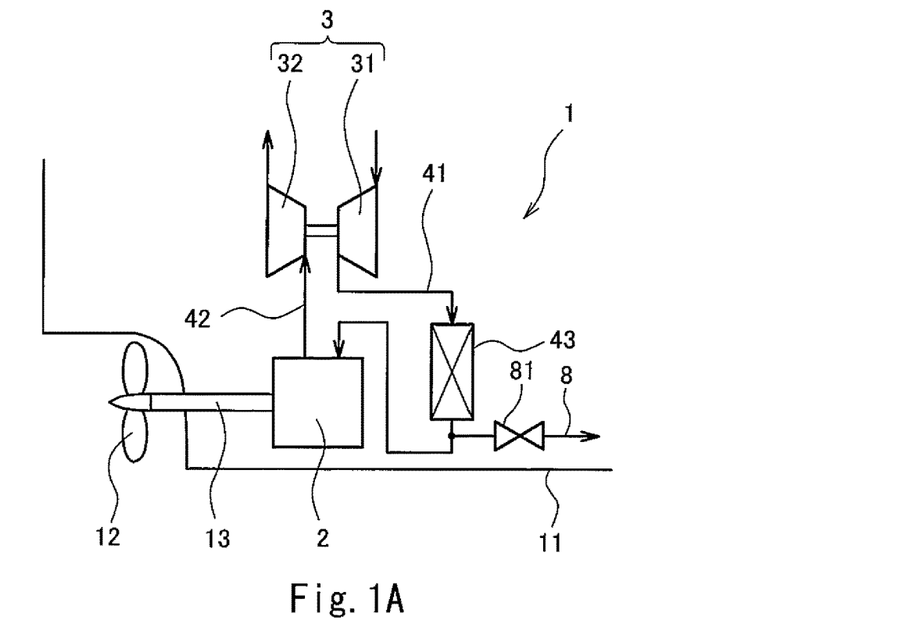
FIG. 1A shows a schematic configuration of a ship in which a gas engine drive system according to one embodiment of the present invention is installed.
Figure 1B:
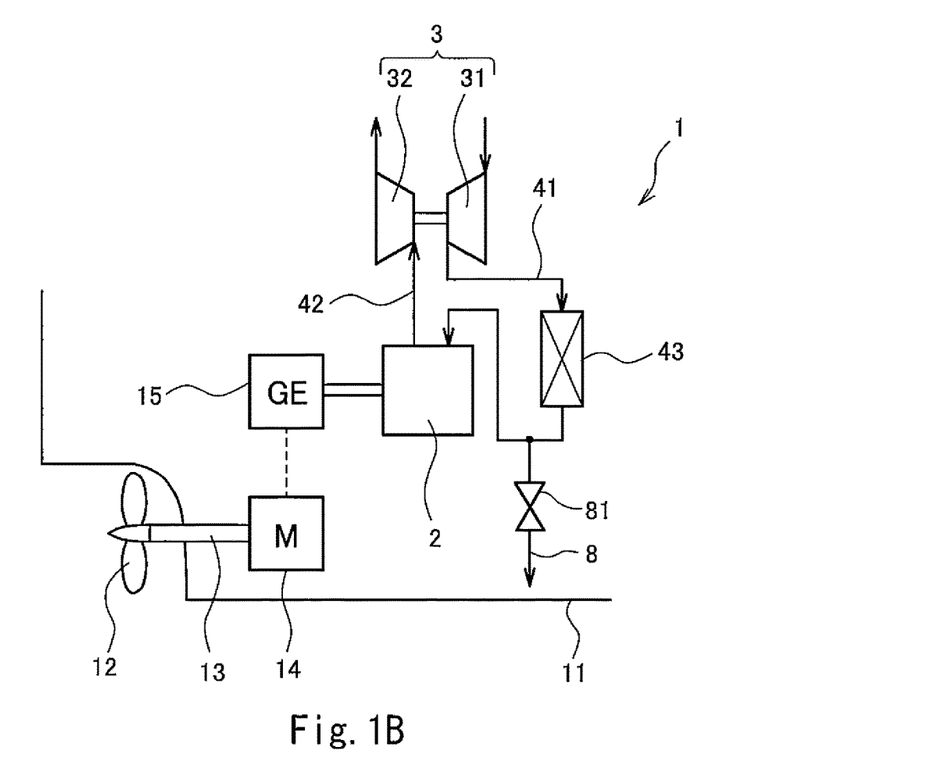
FIG. 1B shows a schematic configuration of the ship according to one variation.

FIG. 1A shows a ship 11, in which a gas engine drive system 1 according to Embodiment 1 of the present invention (hereinafter, simply referred to as "system 1") is installed. The system 1 includes a gas engine 2, a turbocharger 3, and a controller 7 (see FIG. 2). In the present embodiment, a propeller shaft 13 mounted with a propeller 12 is directly driven by the gas engine 2 of the system 1. However, as an alternative, the propeller shaft 13 may be indirectly driven by the gas engine 2 via a motor 14 and a power generator 15 as shown in FIG. 1B. In both the case shown in FIG. 1A and the case shown in FIG. 1B, the gas engine 2 is used as a main engine of the ship 11.

The gas engine 2 is, for example, a pure gas engine that combusts only a fuel gas (e.g., natural gas). Alternatively, the gas engine 2 may be a dual fuel engine that combusts one of or both a fuel gas and a fuel oil depending on the situation. Although the gas engine 2 is a 4-stroke engine in the present embodiment, the gas engine 2 may be a 2-stroke engine.

Figure 2:
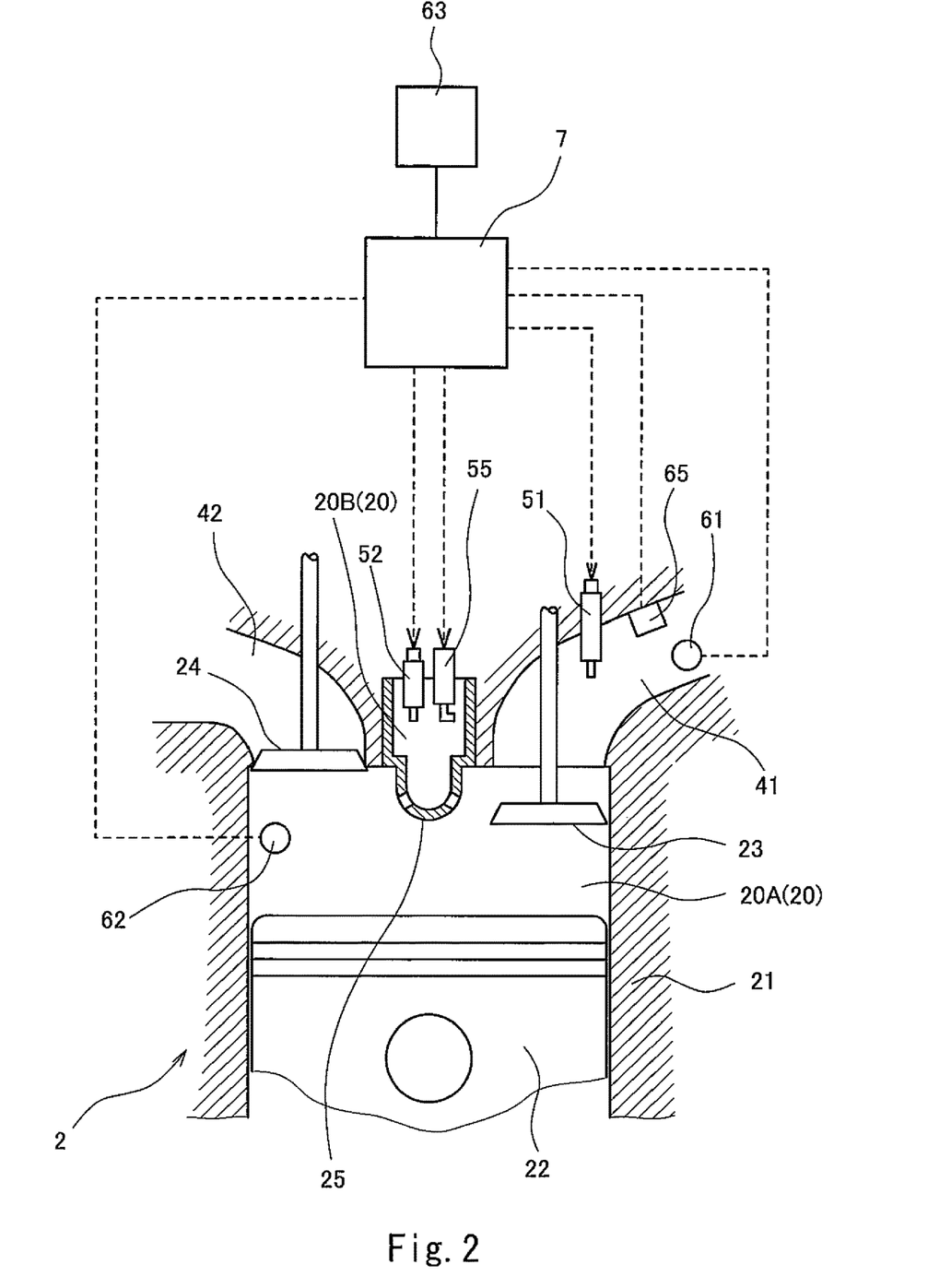
FIG. 2 is a sectional view showing one combustion chamber and its vicinity of a gas engine.

FIG. 2 is a sectional view showing an essential part of the gas engine 2. The gas engine 2 includes a plurality of cylinders 21 (FIG. 2 shows only one cylinder 21). In each cylinder 21, a piston 22 is disposed such that the piston 22 is movable in a reciprocating manner. The cylinder 21 and the piston 22 form a combustion chamber 20. The piston 22 is coupled to an unshown crank shaft by an unshown connecting rod.

In each cylinder 21, the piston 22 reciprocates twice, and thereby one cycle of the gas engine 2 (intake, compression, expansion, and exhaust) is performed. The phase angle (0 to 720 degrees) of the gas engine 2 during one cycle of each cylinder 21 is detected by a phase angle detector 63. For example, the rotation angle of the crank shaft (i.e., crank angle) or the position of the piston 22 can be used as the phase angle. As one example, the phase angle detector 63 is an electromagnetic pickup, a proximity switch, or a rotary encoder. An actual rotational speed N of the gas engine 2 is also detected from the phase angle detector 63.

Each combustion chamber 20 is connected to a compressor 31 of the turbocharger 3 via an intake passage 41, and also connected to a turbine 32 of the turbocharger 3 via an exhaust passage 42. That is, the intake passage 41 leads air compressed by the compressor 31 to each combustion chamber 20 as intake air, and the exhaust passage 42 leads combustion exhaust gas from each combustion chamber 20 to the turbine 32. It should be noted that, in reality, each of the downstream portion of the intake passage 41 and the upstream portion of the exhaust passage 42 branches off from a corresponding manifold into the same number of branch passages as the number of cylinders 21. However, in FIGS. 1A and 1B, each of the intake passage 41 and the exhaust passage 42 is drawn as a single passage for the sake of simplifying the drawings.

The intake passage 41 is provided with a radiator 43 for cooling the intake air supplied from the compressor 31 to each combustion chamber 20. The intake passage 41 is also provided with: a first pressure sensor 61 (corresponding to a pressure detector of the present invention), which detects a charge air pressure that is the pressure of the intake air; and a temperature sensor 65 (corresponding to a temperature detector of the present invention), which detects a charge air temperature that is the temperature of the intake air. The intake passage 41 is further provided with, for each cylinder 21, a main fuel injection valve 51 (corresponding to a fuel injection system of the present invention), which injects a fuel gas into the intake air.

It should be noted that the fuel injection system of the present invention need not be the fuel injection valve 51, so long as the fuel injection system injects the fuel gas into the intake air. For example, similar to Patent Literature 2, the fuel injection system may be configured to include: a fuel gas supply passage that merges with an air supply passage connected to the suction port of the compressor 31; and a fuel flow control valve provided on the fuel gas supply passage, and configured to inject the fuel gas into air sucked into the compressor 31.

Each cylinder 21 is provided with: an intake valve 23, which opens and closes an intake port that is an opening of the intake passage 41, the opening facing the combustion chamber 20; and an exhaust valve 24, which opens and closes an exhaust port that is an opening of the exhaust passage 42, the opening facing the combustion chamber 20. Each cylinder 21 is also provided with a spark plug (an ignition system) 55 for igniting an air-fuel mixture of air and the fuel gas in the combustion chamber 20.

In the present embodiment, the combustion chamber 20 includes: a main combustion chamber 20A, which communicates with the intake passage 41 and the exhaust passage 42; and an auxiliary combustion chamber 20B, which is divided from the main combustion chamber 20A by a dividing wall 25 with communication holes formed therein. The spark plug 55 is disposed in the auxiliary combustion chamber 20B. The fuel gas is injected from an auxiliary fuel injection valve 52 into the auxiliary combustion chamber 20B. A rich air-fuel mixture is formed in the auxiliary combustion chamber 20B by the injection of the fuel gas from the auxiliary fuel injection valve 52, and the air-fuel mixture is ignited by the spark plug 55. As a result, a flame is generated in the auxiliary combustion chamber 20B, and the flame propagates into the main combustion chamber 20A through the communication holes formed in the dividing wall 25. Consequently, a lean air-fuel mixture in the main combustion chamber 20A is also ignited. The main combustion chamber 20A is provided with a second pressure sensor 62, which detects an in-cylinder pressure, which is the pressure in the main combustion chamber 20A.

It should be noted that instead of the spark plug 55, which ignites the air-fuel mixture in the auxiliary combustion chamber 20B, a pilot fuel injection valve that directly injects a high-pressure pilot fuel (oil or fuel gas) into the main combustion chamber 20A to cause self-ignition of the pilot fuel can be adopted as the ignition system.

The combustion exhaust gas from the combustion chamber 20 is fed through the exhaust passage 42 to the turbine 32, in which the combustion exhaust gas is used as motive force for driving the compressor 31.

The system 1 of the present embodiment further includes an open passage 8 for releasing the air in the intake passage 41 into the atmosphere. One end of the open passage 8 is connected to the intake passage 41 at a position downstream of the radiator 43, and the other end of the open passage 8 is open to the atmosphere. The open passage 8 is provided with a blow-off valve 81, which is an open/close valve. It should be noted that the one end of the open passage 8 may be connected to the intake passage 41 at a position upstream of the radiator 43.

The controller 7 calculates a target injection amount of the fuel gas to be injected from the main fuel injection valve 51 in accordance with a required output, and controls the fuel injection valves 51 and 52 and the spark plug 55 based on the phase angle detected by the phase angle detector 63. Specifically, during a time in which the required output hardly varies, the controller 7 performs a steady operation, and when the required output decreases during the steady operation, the controller 7 shifts to a fuel decrease operation. In both the steady operation and the fuel decrease operation, the controller 7 also performs control to keep the actual rotational speed N to a target rotational speed NT. Factors that cause decrease in the required output include: a command from an operator of the ship to lower the navigation speed of the ship; a command to keep the navigation speed when winds and waves that the hull is subjected to have become weaker, and decrease in the propeller pitch of the propeller 12 in a case where the propeller 12 is a variable pitch propeller.

The steady operation is the operation in which the fuel injection amount is substantially constant regardless of whether the load of the gas engine 2 is high or low. As the steady operation, it is desirable to perform a knocking control operation as described in Patent Literature 1. The knocking control operation is the operation of optimizing the ignition timing while keeping the excess air ratio constant in order to achieve high efficiency. In the knocking control operation, control is performed based on the in-cylinder pressure detected by the second pressure sensor 62. It should be noted that a control method used in the knocking control operation is described in detail by Patent Literature 1.

As mentioned above, when the required output decreases during the steady operation, the controller 7 shifts to the fuel decrease operation. Hereinafter, the fuel decrease operation is described in detail. It should be noted that the description of control is given below for only one cylinder 21 as a representative example. The same control is performed for all the cylinders 21.

Figure 3:
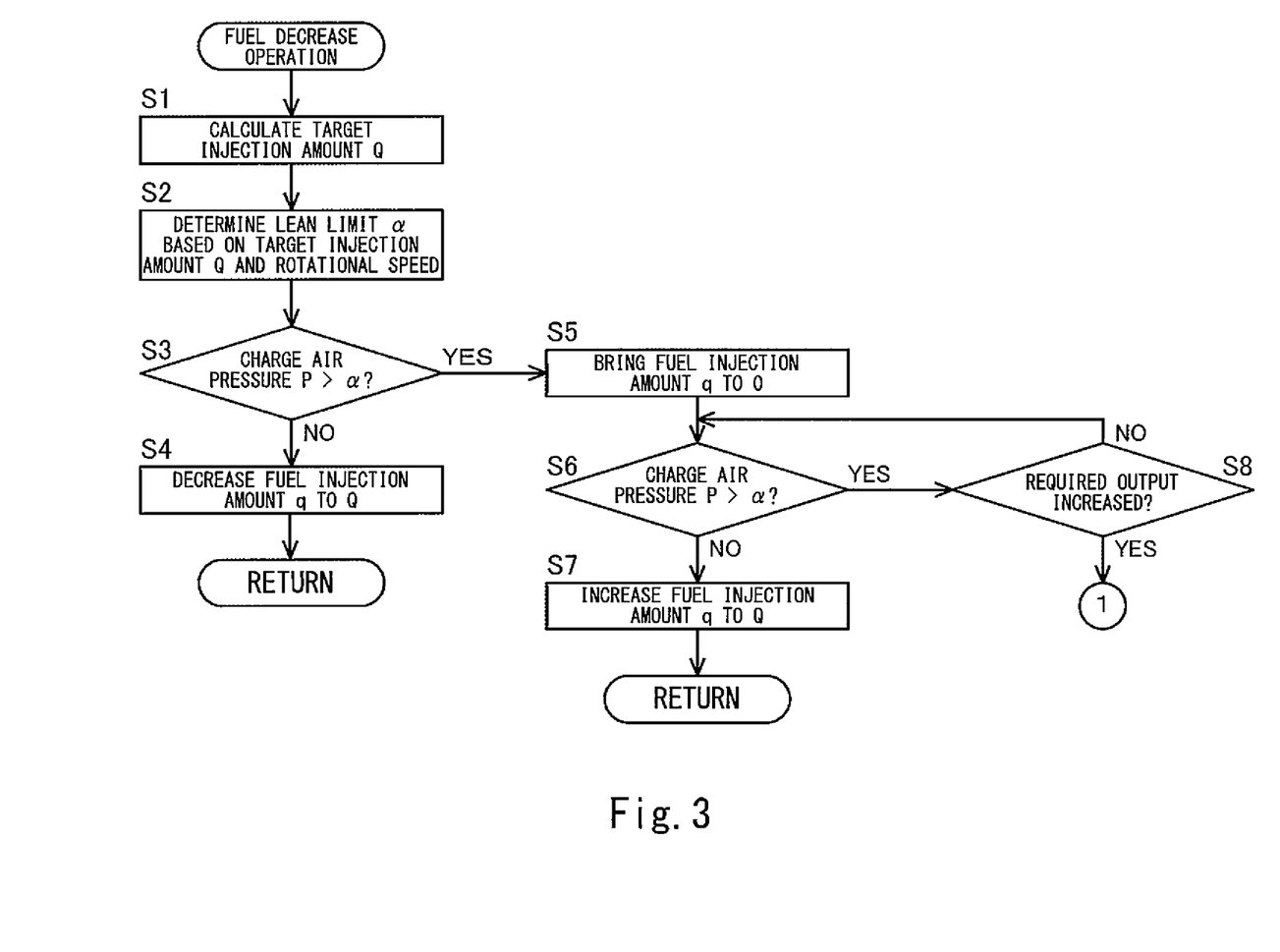
FIG. 3 is a flowchart of a fuel decrease operation.
Figure 4:
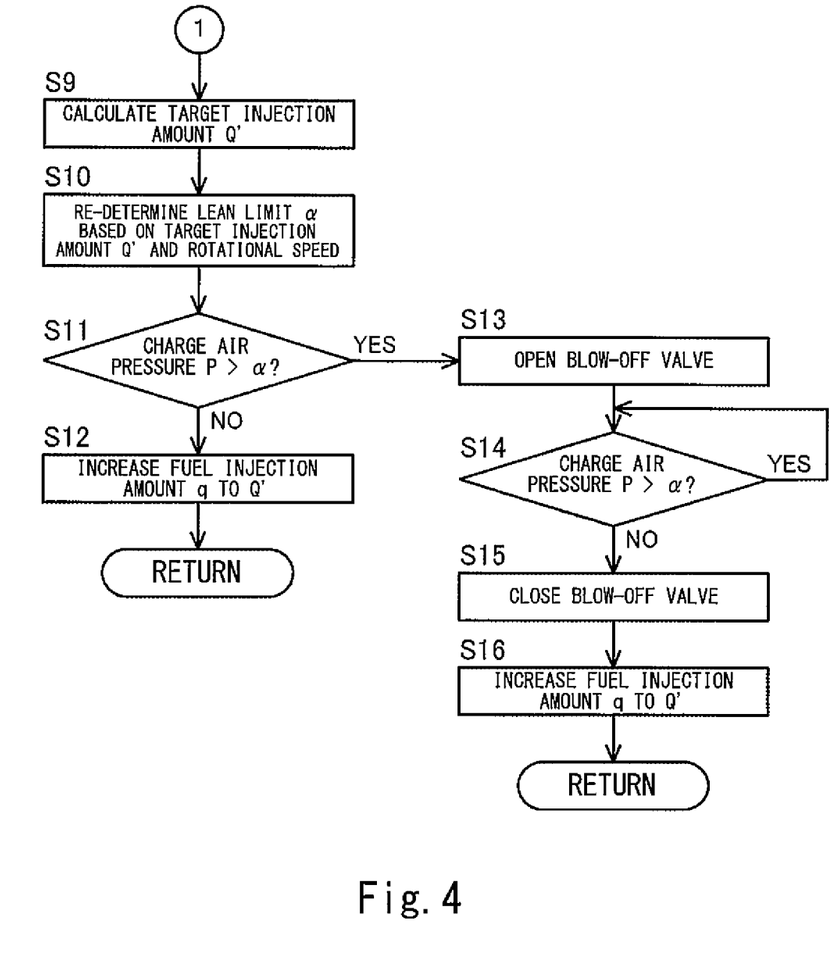
FIG. 4 is a flowchart of the fuel decrease operation.

In the fuel decrease operation, control is performed based on the charge air pressure P detected by the first pressure sensor 61. Each of FIG. 3 and FIG. 4 is a flowchart of the fuel decrease operation.

Figure 5:
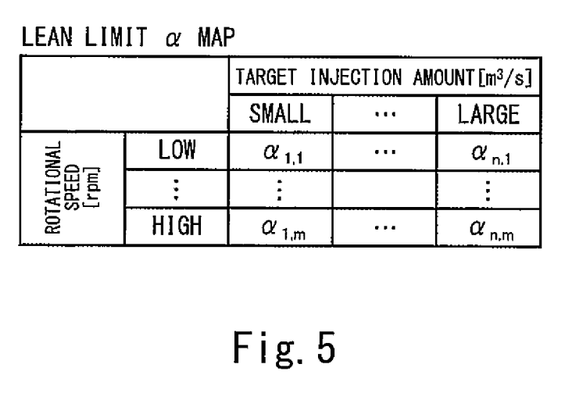
FIG. 5 is a lean limit map in which lean limit values are defined in association with a target injection amount of a fuel gas and a rotational speed of the gas engine.

First, the controller 7 calculates a target injection amount Q corresponding to the required output that has decreased (step S1). Then, the controller 7 determines a lean limit of the charge air pressure based on the calculated target injection amount Q and the actual rotational speed N of the gas engine 2 (step S2). The lean limit is the upper limit value of the charge air pressure for preventing misfire. The lean limit is derived in advance through an experiment or numerical simulation. In the present embodiment, the lean limit $\alpha$ is determined by using a lean limit $\alpha$ map shown in FIG. 5, in which lean limit values $\alpha_{i,j}$ ($1 \leq i \leq n$, $1 \leq j \leq m$) are defined in association with the target injection amount of the fuel gas and the rotational speed of the gas engine 2. It should be noted that, desirably, the lean limit $\alpha$ thus determined is corrected based on the charge air temperature detected by the temperature sensor 65. For example, when the temperature of the intake air is relatively high, the lean limit $\alpha$ is corrected to be higher, and when the temperature of the intake air is relatively low, the lean limit $\alpha$ is corrected to be lower. Alternatively, instead of the map shown in FIG. 5, a three-dimensional map in which the lean limit values are defined in association with the target injection amount of the fuel gas, the rotational speed of the gas engine 2, and the temperature of the intake air may be used.

Thereafter, the controller 7 compares the charge air pressure P detected by the first pressure sensor 61 with the lean limit $\alpha$ (step S3). If the charge air pressure P is lower than or equal to the lean limit $\alpha$ (NO in step S3), the controller 7 decreases a fuel injection amount q from the main fuel injection valve 51 directly to the target injection amount Q (step S4), and returns to the steady operation. This is a normal decrease mode.

Figure 6:
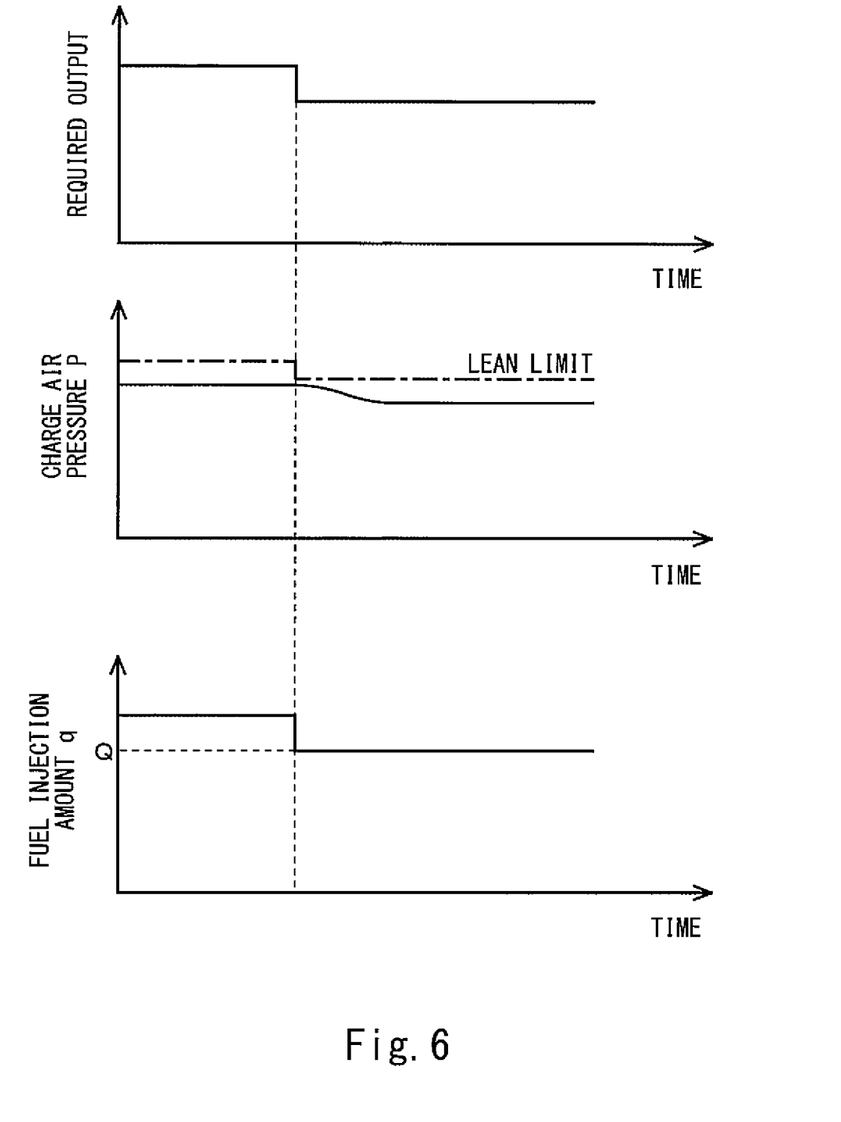
FIG. 6 is a graph showing temporal changes in a required output, a charge air pressure P, and a fuel injection amount q when the fuel injection amount q is decreased directly to a target injection amount Q.

FIG. 6 shows temporal changes in the required output, the charge air pressure P, and the fuel injection amount q in the normal decrease mode. In a case where the degree of decrease in the required output is relatively small, processing is performed in the normal decrease mode.

Figure 7:
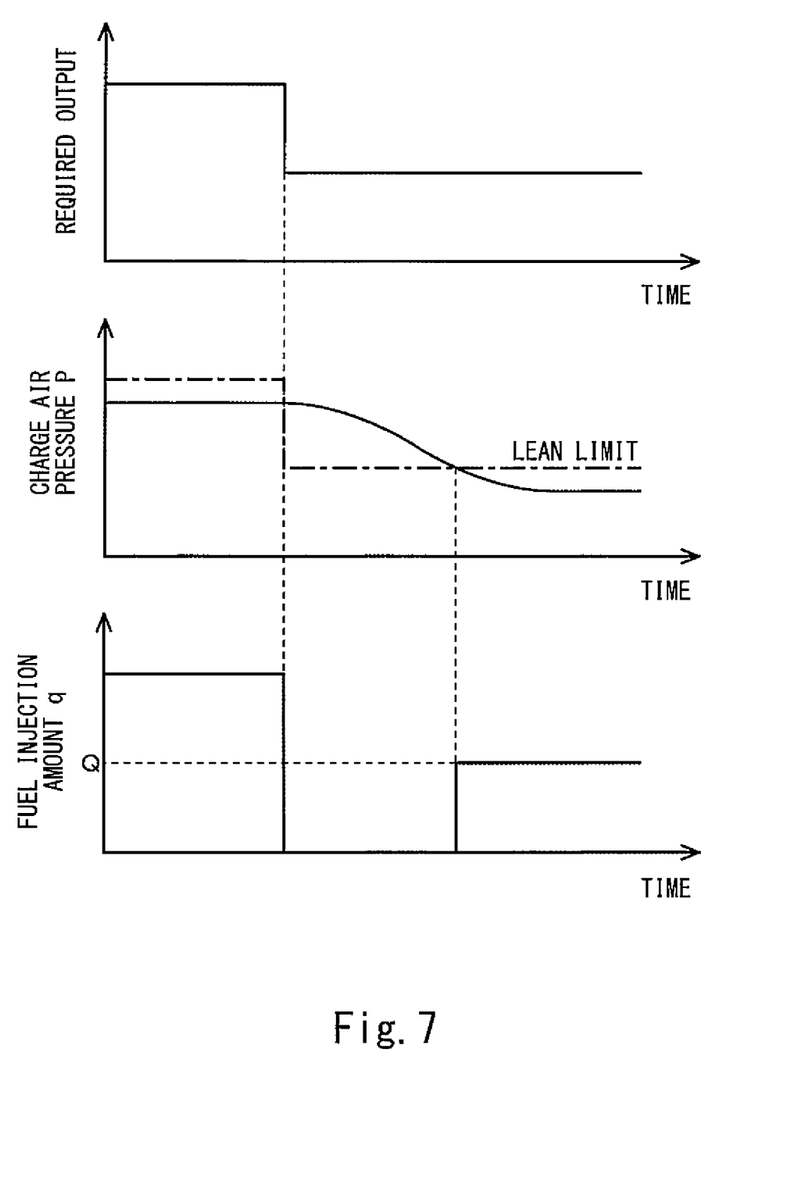
FIG. 7 is a graph showing temporal changes in the required output, the charge air pressure P, and the fuel injection amount q when the fuel injection amount q is increased to the target injection amount Q after bringing the fuel injection amount q to zero.

On the other hand, in a case where the degree of decrease in the required output is relatively great, processing is performed in a transitional decrease mode. FIG. 7 shows temporal changes in the required output, the charge air pressure P, and the fuel injection amount q in the transitional decrease mode.

As a result of the comparison in step S3, if the charge air pressure P detected by the first pressure sensor 61 is higher than the lean limit $\alpha$ determined in step S2 (YES in step S3), the controller 7 brings the fuel injection amount q to zero (step S5). In other words, the fuel is cut off. Of course, during a time in which the fuel injection amount q from the main fuel injection valve 51 is kept to zero, the fuel injection amount from the auxiliary fuel injection valve 52 is also kept to zero. Thereafter, until the charge air pressure P detected by the first pressure sensor 61 becomes lower than or equal to the lean limit $\alpha$, the controller 7 keeps the fuel injection amount q to zero (YES in step S6). When the charge air pressure P becomes lower than or equal to the lean limit $\alpha$ (NO in step S6), the controller 7 increases the fuel injection amount q to the target injection amount Q (step S7), and returns to the steady operation. This is the transitional decrease mode.

Figure 8:
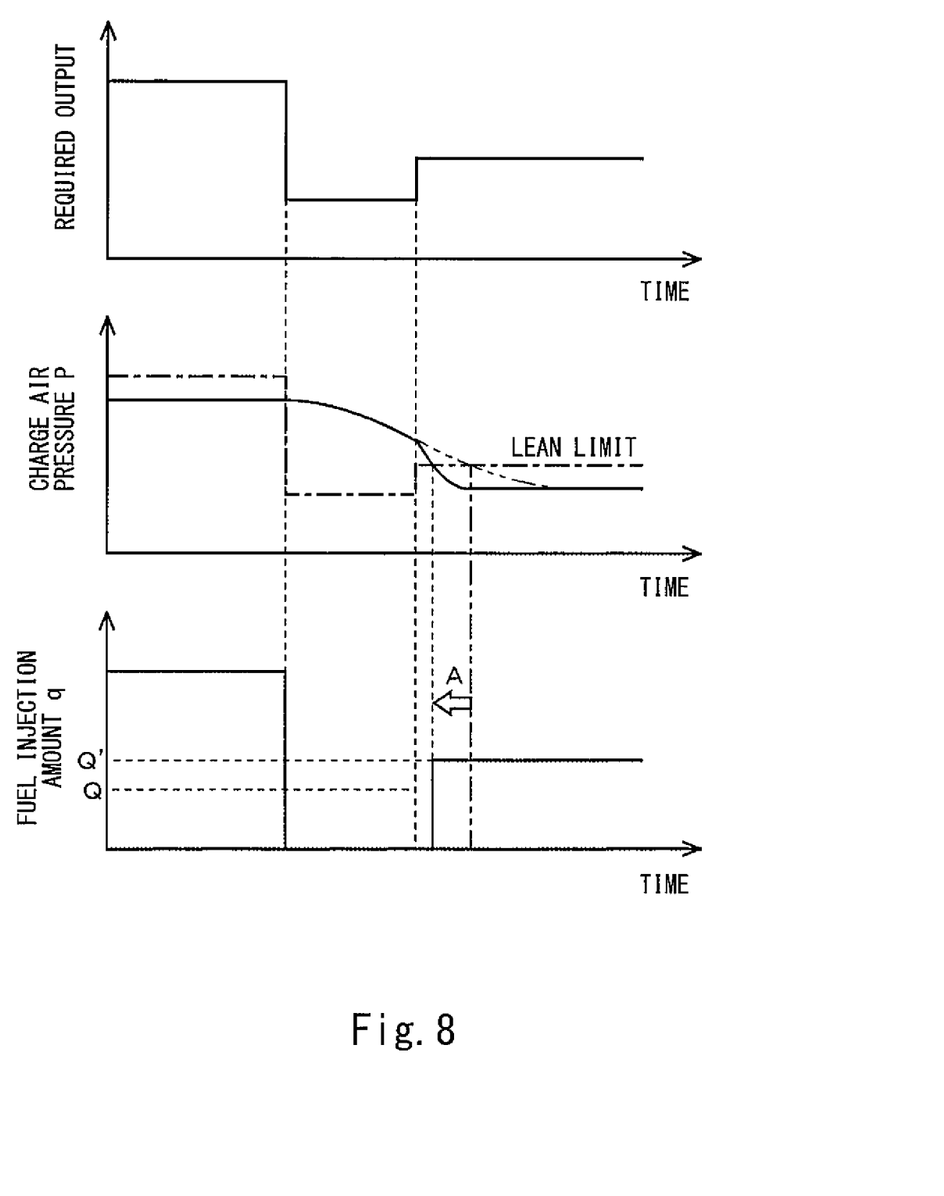
FIG. 8 is a graph showing temporal changes in the required output, the charge air pressure P, and the fuel injection amount q when the required output increases during a time in which the fuel injection amount is kept to zero.

During the time in which the fuel injection amount q is kept to zero, the controller 7 further determines whether or not the required output has increased (step S8). In other words, so long as the required output does not increase (NO in step S8), the comparison in step S6 is repeated. When the required output increases during the time in which the fuel injection amount q is kept to zero (YES in step S8), the controller 7 performs processing in a re-determining mode shown in FIG. 4. FIG. 8 shows temporal changes in the required output, the charge air pressure P, and the fuel injection amount q in the re-determining mode.

First, the controller 7 calculates a target injection amount Q' corresponding to the required output that has increased (step S9). Then, the controller 7 re-determines the lean limit $\alpha$ of the charge air pressure based on the calculated target injection amount Q' and the current rotational speed of the gas engine 2 by using the lean limit $\alpha$ map shown in FIG. 5 again (step S10).

Thereafter, the controller 7 compares the charge air pressure P detected by the first pressure sensor 61 with the re-determined lean limit $\alpha$ (step S11). If the charge air pressure P is lower than or equal to the lean limit $\alpha$ (NO in step S11), the controller 7 increases the fuel injection amount q from the main fuel injection valve 51 from 0 to the target injection amount Q' (step S12), and returns to the steady operation.

On the other hand, as a result of the comparison in step S11, if the charge air pressure P detected by the first pressure sensor 61 is higher than the re-determined lean limit $\alpha$ (YES in step S11), the controller 7 opens the blow-off valve 81 (step S13). Consequently, the charge air pressure P decreases immediately. Then, when the charge air pressure P detected by the first pressure sensor 61 becomes lower than or equal to the re-determined lean limit $\alpha$ (NO in step S14), the controller 7 closes the blow-off valve 81 (step S15), increases the fuel injection amount q from 0 to the target injection amount Q' (step S16), and returns to the steady operation.

If the blow-off valve 81 is not opened, then as indicated by a two-dot chain line in FIG. 8, it may take some time for the charge air pressure P to become lower than or equal to the lean limit $\alpha$ after the required output increases. On the other hand, if the blow-off valve 81 is opened, the charge air pressure P can be lowered immediately, and thereby the timing at which the fuel gas can be injected without causing misfire can be made earlier as indicated by an arrow A in FIG. 8. This consequently makes it possible to improve the responsiveness of the gas engine 2 to the increase in the required output.

As described above, in the gas engine drive system 1 of the present embodiment, when the required output decreases, the fuel gas is not injected if the charge air pressure P is higher than the lean limit $\alpha$. This makes it possible to prevent misfire and suppress the discharge of the uncombusted fuel gas. If the charge air pressure P is lower than or equal to the lean limit $\alpha$ when the required output decreases, or if the charge air pressure P becomes lower than or equal to the lean limit $\alpha$ during the time in which the fuel injection amount q is kept to zero, then the fuel injection amount q is set to the target injection amount Q. This makes it possible to shift the fuel injection amount q to the target injection amount Q at an optimal timing.

The present invention is not limited to the above-described embodiment. Various modifications can be made without departing from the spirit of the present invention. For example, the open passage 8 may be eliminated.

INDUSTRIAL APPLICABILITY

The gas engine drive system of the present invention is not necessarily used in a ship, but may be used in, for example, power generating equipment, construction machines, or railways.

REFERENCE SIGNS LIST 1 gas engine drive system
11 ship
2 gas engine
20 combustion chamber
21 cylinder
22 piston
3 turbocharger
31 compressor
32 turbine
41 intake passage
42 exhaust passage
51 main fuel injection valve (fuel injection system)
52 auxiliary fuel injection valve
61 first pressure sensor (pressure detector)
62 second pressure sensor
65 temperature sensor (temperature detector)
7 controller
8 open passage
81 blow-off valve (open/close valve)

The invention claimed is:

1. A gas engine drive system comprising:
a gas engine including a combustion chamber formed by a cylinder and a piston;
a turbocharger including a compressor connected to the combustion chamber via an intake passage and a turbine connected to the combustion chamber via an exhaust passage;
a fuel injection system that injects a fuel gas into intake air that is supplied from the compressor to the combustion chamber via the intake passage;
a pressure detector that detects a charge air pressure that is a pressure of the intake air; and
a controller that controls the fuel injection system, the controller calculating a target injection amount of the fuel gas in accordance with a required output, wherein the controller:
when the required output decreases, determines a lean limit of the charge air pressure based on the target injection amount corresponding to the required output that has decreased;
if the charge air pressure detected by the pressure detector is lower than or equal to the lean limit, decreases a fuel injection amount to the target injection amount; and
if the charge air pressure detected by the pressure detector is higher than the lean limit, brings the fuel injection amount to zero, and then when the charge air pressure detected by the pressure detector becomes lower than or equal to the lean limit, increases the fuel injection amount to the target injection amount.

2. The gas engine drive system according to claim 1, further comprising a temperature detector that detects a temperature of the intake air, wherein
after determining the lean limit of the charge air pressure, the controller corrects the lean limit of the charge air pressure based on the temperature of the intake air detected by the temperature detector.

3. The gas engine drive system according to claim 1, wherein
the controller determines the lean limit by using a lean limit map in which lean limit values are defined in association with the target injection amount and a rotational speed of the gas engine.

4. The gas engine drive system according to claim 1, further comprising an open passage for releasing air in the intake passage into an atmosphere, the open passage being provided with an open/close valve, wherein
the controller:
when the required output increases during a time in which the fuel injection amount is kept to zero, re-determines the lean limit of the charge air pressure based on the target injection amount corresponding to the required output that has increased;
if the charge air pressure detected by the pressure detector is lower than or equal to the re-determined lean limit, increases the fuel injection amount to the target injection amount; and
if the charge air pressure detected by the pressure detector is higher than the re-determined lean limit, opens the open/close valve.

5. The gas engine drive system according to claim 4, wherein
after opening the open/close valve, when the charge air pressure detected by the pressure detector becomes lower than or equal to the re-determined lean limit, the controller closes the open/close valve, and increases the fuel injection amount to the target injection amount.

6. A method of controlling a gas engine equipped with a turbocharger, the method comprising:
when a required output decreases, determining a lean limit of a charge air pressure that is a pressure of intake air supplied from the turbocharger to the gas engine;
if the charge air pressure is lower than or equal to the lean limit, decreasing a fuel injection amount to a target injection amount corresponding to the required output that has decreased; and
if the charge air pressure is higher than the lean limit, bringing the fuel injection amount to zero, and then when the charge air pressure becomes lower than or equal to the lean limit, increasing the fuel injection amount to the target injection amount.

7. The method of controlling the gas engine according to claim 6, comprising:
when the required output increases during a time in which the fuel injection amount is kept to zero, re-determining the lean limit of the charge air pressure;
if the charge air pressure is lower than or equal to the re-determined lean limit, increasing the fuel injection amount to a target injection amount corresponding to the required output that has increased; and
if the charge air pressure is higher than the re-determined lean limit, releasing air that is to be supplied from the turbocharger to the gas engine into an atmosphere.

8. The method of controlling the gas engine according to claim 6, wherein
the gas engine is used as a main engine of a ship.

9. The gas engine drive system according to claim 2, wherein
the controller determines the lean limit by using a lean limit map in which lean limit values are defined in association with the target injection amount and a rotational speed of the gas engine.

10. The gas engine drive system according to claim 2, further comprising an open passage for releasing air in the intake passage into an atmosphere, the open passage being provided with an open/close valve, wherein
the controller:
when the required output increases during a time in which the fuel injection amount is kept to zero, re-determines the lean limit of the charge air pressure based on the target injection amount corresponding to the required output that has increased;
if the charge air pressure detected by the pressure detector is lower than or equal to the re-determined lean limit, increases the fuel injection amount to the target injection amount; and
if the charge air pressure detected by the pressure detector is higher than the re-determined lean limit, opens the open/close valve.

11. The gas engine drive system according to claim 3, further comprising an open passage for releasing air in the intake passage into an atmosphere, the open passage being provided with an open/close valve, wherein
the controller:
when the required output increases during a time in which the fuel injection amount is kept to zero, re-determines the lean limit of the charge air pressure based on the target injection amount corresponding to the required output that has increased;
if the charge air pressure detected by the pressure detector is lower than or equal to the re-determined lean limit, increases the fuel injection amount to the target injection amount; and
if the charge air pressure detected by the pressure detector is higher than the re-determined lean limit, opens the open/close valve.

12. The gas engine drive system according to any one of claim 9, further comprising an open passage for releasing air in the intake passage into an atmosphere, the open passage being provided with an open/close valve, wherein
the controller:
when the required output increases during a time in which the fuel injection amount is kept to zero, re-determines the lean limit of the charge air pressure based on the target injection amount corresponding to the required output that has increased;
if the charge air pressure detected by the pressure detector is lower than or equal to the re-determined lean limit, increases the fuel injection amount to the target injection amount; and
if the charge air pressure detected by the pressure detector is higher than the re-determined lean limit, opens the open/close valve.

13. The gas engine drive system according to claim 10, wherein
after opening the open/close valve, when the charge air pressure detected by the pressure detector becomes lower than or equal to the re-determined lean limit, the controller closes the open/close valve, and increases the fuel injection amount to the target injection amount.

14. The gas engine drive system according to claim 11, wherein
after opening the open/close valve, when the charge air pressure detected by the pressure detector becomes lower than or equal to the re-determined lean limit, the controller closes the open/close valve, and increases the fuel injection amount to the target injection amount.

15. The gas engine drive system according to claim 12, wherein
after opening the open/close valve, when the charge air pressure detected by the pressure detector becomes lower than or equal to the re-determined lean limit, the controller closes the open/close valve, and increases the fuel injection amount to the target injection amount.

16. The method of controlling the gas engine according to claim 7, wherein
the gas engine is used as a main engine of a ship.

* * * * *